United States Patent

Krishnakumar et al.

[11] Patent Number: 4,483,436
[45] Date of Patent: Nov. 20, 1984

[54] TRANSPORT PALLET

[75] Inventors: Suppayan M. Krishnakumar, Nashua; Martin H. Beck, Brookline; Ieuan L. Harry, Nashua, all of N.H.

[73] Assignee: The Continental Group, Inc., Stamford, Conn.

[21] Appl. No.: 327,571

[22] Filed: Dec. 4, 1981

[51] Int. Cl.³ .............................................. B65G 49/00
[52] U.S. Cl. ..................................... 198/648; 198/656
[58] Field of Search ............... 198/646, 648, 656, 377, 198/378, 437, 845, 838, 795, 472; 104/1 A, 138 R; 105/157 R, 157 T, 158 A, 158 R, 29 R

[56] References Cited

U.S. PATENT DOCUMENTS

| 2,658,607 | 11/1953 | Moynihan | 198/845 |
| 2,717,699 | 9/1955 | Spindler et al. | 198/795 |
| 2,789,683 | 4/1957 | Stahl | 198/795 |
| 3,404,638 | 10/1968 | Edwards | 104/138 R |
| 3,958,685 | 5/1976 | McDonald et al. | 198/377 |
| 4,185,812 | 1/1980 | Hall | 198/648 |

FOREIGN PATENT DOCUMENTS 1035566 7/1958 Fed. Rep. of Germany ...... 198/845

Primary Examiner—Joseph E. Valenza
Assistant Examiner—Kyle E. Shane
Attorney, Agent, or Firm—Charles E. Brown

[57] ABSTRACT

This relates to a pallet for carrying and simultaneously presenting to a plurality of blow molds preforms. The pallet includes an elongated bar which has rotatably journalled therein a number of collets and the bar is provided with support and guide rollers which are engageable with opposed channel-shaped track members to guidingly support the pallet for movement along a predetermined path and into the space between one set of blow mold halves. The pallet is provided with drive means for effecting the feeding thereof together with a holding pin to permit the retention thereof in a selected position. Each collet is rotatably journalled within the bar so that it may be rotated to facilitate the even heating of the preforms. The lower end of each collet is provided with ball detent devices which are so associated with a retaining surface on each preform so as to effect a tight, but releasable, holding of the preform within the collet in alignment with the collet. This abstract forms no part of the specification of this application and is not to be construed as limiting the claims of the application.

11 Claims, 8 Drawing Figures

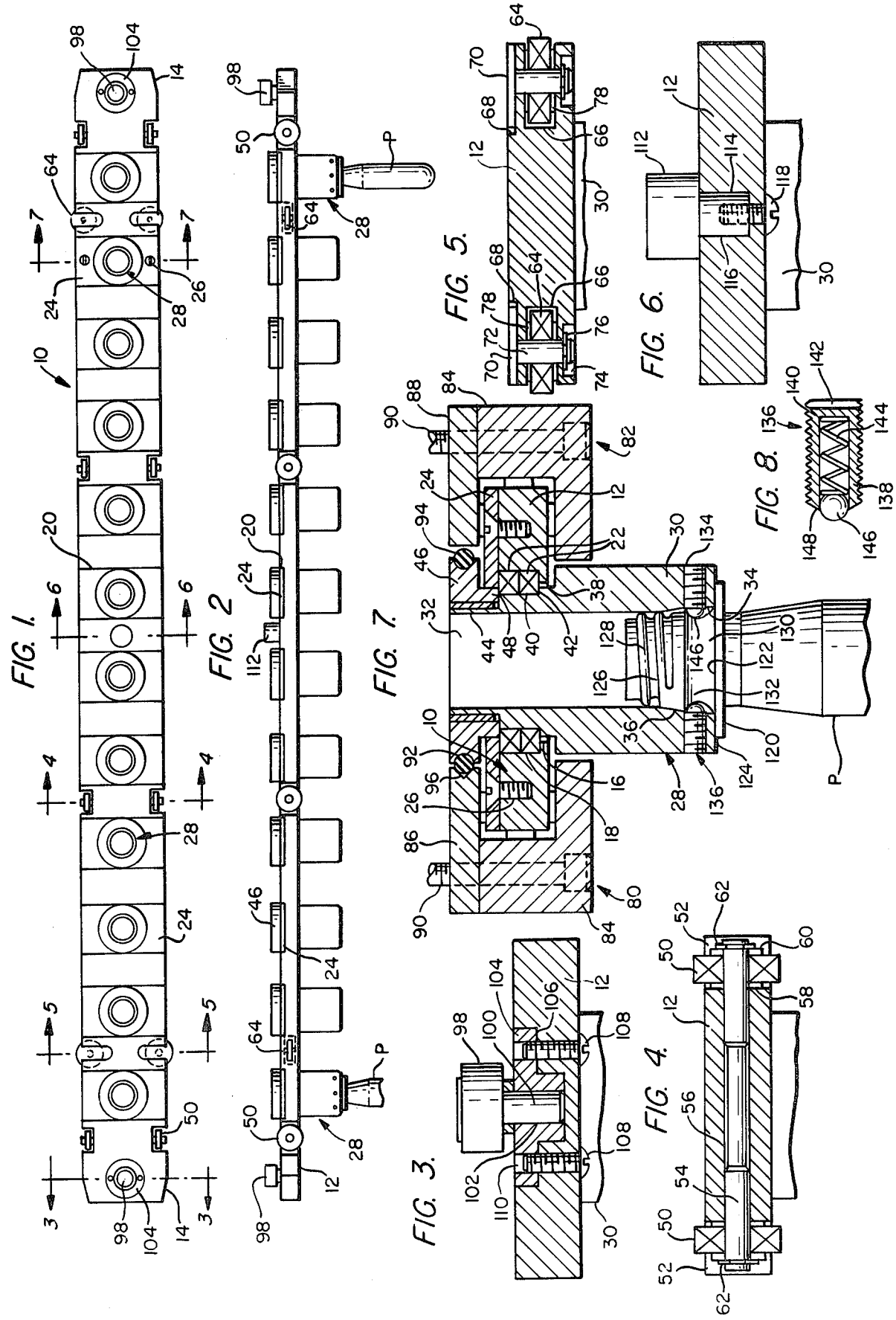

TRANSPORT PALLET

This invention relates in general to the transport of preforms into a blow molding machine and the carrying of the resultant blow molded articles from such machine, and more particularly to a transport structure for such preforms.

In accordance with this invention, there is provided a pallet which is equipped with suitable rollers to effect the guided movement thereof through a pair of opposed channel-shaped tracks. The pallet is primarily in the form of an elongated, relatively wide flat bar which is notched to effect the mounting of the necessary support and guide rollers.

The bar of the pallet also has a plurality of through-bores in which there are mounted collets, each collet being intended to support a preform. The collets are spaced apart on centers so as to match molds of selected spacings and, when the pallet is properly positioned within a blow mold structure, it will present preforms in alignment with the blow molds of the blow molding machine.

The collets are spaced so that one may mount therein preforms for different size bottles. For example, the center-to-center spacing of the collets is such as to receive half liter bottle preforms. This spacing permits every other collet to receive two liter preforms and further permits an alignment wherein a number of one liter preforms may be carried by the same collets for presentation to adjacent one liter bottle molds.

Each collet is mounted within the bar for rotation, and includes an upper collar portion which is provided with a friction surface for engaging a rub rail so as to effect rotation of the collets in response to movement of the pallet.

The lower part of each collet is provided with apparatus for engaging a neck portion of a preform in a manner tightly to engage an upper surface of a support flange of the preform against a lower abutment surface of the collet. It is preferred that the preforms be held in place by spring loaded detents, preferably ball detents, which permit the snap engagement of a preform into a collet with the balls of the detent retracting under pressure from the preform neck and then springing back to engage the preform along a retaining surface thereof in a manner which forces the preform into the collet and also effects an automatic holding of the preform in alignment with the collet.

With the above and other objects in view that will hereinafter appear, the nature of the invention will be more clearly understood by reference to the following detailed description, the appended claims, and the several views illustrated in the accompanying drawings.

IN THE DRAWINGS

FIG. 1 is a plan view of a pallet formed in accordance with this invention.

FIG. 2 is a side elevational view of the pallet of FIG. 1, and shows preforms positioned in the endmost collets.

FIG. 3 is an enlarged transverse vertical sectional view taken generally along the line 3—3 of FIG. 1, and shows the details of the mounting of a drive element carried by the pallet.

FIG. 4 is an enlarged fragmentary transverse vertical sectional view taken generally along the line 4—4 of FIG. 1, and shows the mounting of support rollers.

FIG. 5 is an enlarged fragmentary transverse vertical sectional view taken generally along the line 5—5 of FIG. 1, and shows the mounting of guide rollers.

FIG. 6 is an enlarged fragmentary transverse vertical sectional view taken generally along the line 6—6 of FIG. 1, and shows the mounting of a pallet holding pin.

FIG. 7 is an enlarged fragmentary transverse vertical sectional view taken generally along the line 7—7 of FIG. 1, and shows the specifics of a collet including the mounting thereof and the relationship thereof with a preform.

FIG. 8 is an enlarged sectional view through one of the ball detents of the collet, and shows the constructional details thereof.

Referring now to the drawings in detail, there is illustrated the pallet which is the subject of this invention, the pallet being generally identified by the numeral 10. The pallet 10 includes a relatively wide flat bar 12, the cross section of which is best illustrated in FIG. 6. The bar 12 has tapered end portions 14 to facilitate the entry thereof into guide tracks which will be described hereinafter.

The bar 12 is provided at regularly spaced intervals with bores 16 (FIG. 7) which extend entirely through the bar and which have associated counterbores 18. The bar 12 is also provided in the upper surface thereof with a transversely extending slot 20 which is centered on each bore 16.

In each counterbore 18 there is positioned a pair of conventional bearings 22 of the type having inner and outer races. The outer races of the bearings 22 fit tightly within the counterbore 18. The bearings 22 are held in place by an apertured plate 24 which is seated in each slot 20 and which is secured in place by fasteners 26. The bearings 22 support for rotation within the bar 12 a plurality of vertically disposed collets 28, there being one collet for each bore 16. Each collet 28 includes a tubular member 30 having a bore 32 therethrough. The diameter of the bore 32 is in accordance with the diameter of the neck of a preform to be associated with the collet, as will be described in detail hereinafter. The bore 32 is enlarged at its lower end as at 34 and then tapers as at 36 to its final diameter.

The exterior surface of the tubular member 30 is stepped as at 38 to form a clearance and at 40 to define a shoulder 42. The upper end of the tubular member 30 is of a reduced diameter and externally threaded as at 44.

The diameter of the portion 40 is one tightly to fit the inner races of the bearings 22, and the shoulder 42 is of a width fully to engage such inner races.

The tubular member 30 carries at its upper end a collar 46 which is internally threaded and is threadingly engaged on the threaded upper portion 44 of the tubular member. A reduced diameter lower portion 48 of the collar engages the inner race of the upper bearing 22 and thus prevents vertical movement between the tubular member 30 and the bearings 22 which are restrained against vertical movement in the bar 12 by the plate 24.

The tubular member 30, in each instance, is thus mounted for rotation within the bar 12 while being fixed against other movement relative to the bar 12.

The bar 12 is provided with a plurality of support rollers 50 for supporting the same within the channel-shaped track member, as will be described hereinafter. The support rollers 50 are arranged in transversely aligned pairs, as is shown in FIG. 1, and each support roller 50 is positioned within a through notch 52 in a side edge portion of the bar 12. Each pair of support rollers 50 is carried by a single axle 54 which extends through a transverse bore 56 in the bar 12 and opens into the associated notches 52. The support rollers 50 are rotatably journalled on the ends of the axle 54 within the notches 52 and preferably have associated therewith inner and outer thrust washers 58, 60. Suitable removable retaining means, such as clips 62, retain the support members 50 on the axle 54.

The pallet 10 also includes pairs of guide rollers 64 adjacent opposite ends of the bar 12. The guide rollers 64 of each pair are arranged in transverse alignment as is shown in FIG. 1, and each guide roller 64 is mounted in a notch 66 which lies generally within the median plane of the bar 12 and opens through a respective side edge of the bar 12.

In the upper surface of the bar 12, in alignment with each notch 66, there is a shallow slot 68. The slot 68 receives a narrow, elongated flat head 70 of a pin 72 on which each of the guide rollers 64 is rotatably journalled. The pin 72 has its lower end opening into a recess 74 in the underside of the bar 12 with the lower end of each pin 72 being retained in place by a removable retaining element such as a clip 76.

Suitable thrust washers 78 may be mounted on the pin 72 within the notch 66 above and below each guide roller 64.

Reference is now made to FIG. 7 wherein the pallet 10 is illustrated as being mounted within a typical guide track arrangement which includes a pair of track members 80, 82. Each of the track members 80, 82 is of a channel-shaped configuration and includes a lower L-shaped cross sectional bar 84. Associated with each of the bars 84 is an upper plate, the upper plate of the track member 80 being identified by the numeral 86 while the upper plate of the track member 82 being identified by the numeral 88. The track members 80, 82 are secured to a suitable support (not shown) by through bolts 90.

The plate 88 is shorter than the plate 86 and is spaced from the collet 30. At this time it is pointed out that the collar 46 of the collet 30 has an external groove 92 in which there is seated a friction ring 94 which may be in the form of a simple O-ring. The plate 86 extends to a point closely adjacent the collar 46 and has in the edge thereof opposing the collar a groove 96 positioned to receive the O-ring 94 in friction engagement. Thus, as the pallet 10 moves along and through the track members 80, 82, the collets 28 will be rotated.

It is to be understood that a suitable transport mechanism (not shown) will move the pallets through the track members 80, 82. To this end there is mounted on the pallet adjacent each end of the bar 12 a drive member in the form of a roller 98 which is carried by a pin 100 which, in turn, is pressed or otherwise secured in a bore 102 of a mounting member 104. The bar 12 is provided with a socket 106 in the upper surface thereof of a cross section corresponding to that of the mounting member 104, which mounting member is of a stepped configuration so as to tightly fit within the socket 106 and remain seated therein under the influence of a pair of fasteners 108 which extent upwardly through the bar 12 from the bottom and are threaded into internally threaded bores 110 in the mounting member 104.

Referring now to FIG. 6, it will be seen that the bar 12 also carries a centrally located pallet holding pin 112. The pin 112 has a reduced diameter lower portion 114 which is seated in a blind bore 116 extending down from the upper surface of the bar 12. A fastener 118 extends upwardly from the underside of the bar 12 through the pin portion 114 to secure the pin 112 in place.

The collet 28 is primarily intended to receive preforms P for blow molded bottles, although the preforms could be for any type of member. The illustrated preform P includes a supporting flange 120 by means of which the preform is supported during certain handling operations, the flange 120 also being utilized in supporting the resultant blow molded bottle (not shown). The supporting flange 120 has an upper surface 122 which is brought into engagement with a lower abutment surface 124 at the lower end of the tubular member 30.

The preform P has an upper neck finish 126 including threads 128. The diameter of the threads 128 is only slightly less than that of the bore 32 so that there is a guided fit of the neck finish 126 within the bore 32. It will be seen that the neck finish 126 will be automatically guided into the smaller diameter bore 32 by the provision of the larger diameter of the bore at the lower end thereof at 34 and by way of the taper 36.

The neck finish 126 is provided, below the threads 128 and above the supporting flange 120, with a retaining groove 130. The retaining groove 130 is of a cross section such that the upper portion thereof defines a retaining surface 132 which is of a special configuration so as to, when engaged, place an upward force on the neck finish 126 as will be described in detail.

The lower part of the tubular member 30 is provided with a plurality of circumferentially spaced radial bores 134 which are disposed normal to the axis of the bore 32. In each of the bores 134, which are internally threaded, there is adjustably positioned a ball detent device 136.

Referring now to FIG. 8, it will be seen that each ball detent device 136 includes a tubular housing 138 which is externally threaded and which is provided with a closed end 140 having a suitable transverse screwdriver slot 142 formed in the outer face thereof. A compression spring 144 is disposed within the housing 138 and urges a ball member 146 out of the open end of the housing 138. The open end portion of the housing 138 is deformed as at 148 to prevent escape of the ball 146 while permitting the ball to project beyond the housing for engagement with the retaining surface 132.

The positions of the balls 146 are adjusted so that when a preform is presented to a collet 28 from therebeneath, and the preform is moved vertically into the collet, the balls 146 will retract to permit the passage of the neck portion 126 of the preform. At this time the supporting flange 120 engages the abutment surface 124, the balls 146 enter into the groove 130 and bear against the retaining surface 132 so as to urge the neck portion 126 into the bore 32 and thus tightly hold the surface 122 of the supporting flange 20 against the abutment surface 124. This assures that the preform will now be suspended from the collet 28 in alignment with the axis of the collet 28 for presentation to an associated blow mold in which the upper portion of the preform is clamped.

The pallet 10 has been illustrated as carrying twelve collets 28. These collets are so spaced wherein the twelve preforms carried by the collets may be aligned with twelve blow molds so that twelve preforms may be simultaneously blow molded into twelve articles. The preferred articles are half liter bottles. The spacing of the collets 28 is such that when it is desired to utilize the pallet 10 to support preforms for two liter bottles, every other collet will carry a preform. Further, the spacing of the collets is such that, for example, eight preforms for one liter bottles may be carried by the pallet. It is to be understood, of course, that the number of collets is not restricted to twelve, and it is presently envisioned that the number will be increased to twenty.

Although only a preferred embodiment of the invention has been specifically illustrated and described herein, it is to be understood that minor variations may be made in the pallet and the components thereof without departing from the spirit and scope of the invention as defined by the appended claims.

We claim:

1. A pallet particularly adapted for carrying preforms in a blow molding machine, said pallet comprising an elongated flat bar, first notches formed through said bar along opposite edges of said bar at longitudinally spaced portions and in the thickness direction, support rollers seated in said first notches within the width of said bar and projecting above and below said bar in the thickness direction, second notches formed in and opening from opposite edges of said bar at longitudinally spaced intervals, guide rollers lying within the general plane of said bar within said second notches and extending outwardly from opposite sides of said bar, and preform holders extending through said bar at longitudinally spaced intervals.

2. A pallet according to claim 1 wherein said support rollers are arranged in transversely aligned pairs, and a single axle extending tranversely through said bar along a central plane of said bar.

3. A pallet according to claim 1 wherein said guide rollers are each mounted on a pin extending in the thickness direction of said bar through said second notches, a slot in the upper surface of said bar, said pin having an upper head seated in said slot for preventing rotation of said pin, a recess in the lower surface of said bar receiving a lower end of said pin, locking means in said recess engaging and restraining said pin, and a respective roller journalled on said pin.

4. A pallet according to claim 1 together with drive means for said pallet projecting above said bar adjacent each end of said bar.

5. A pallet according to claim 4 wherein each drive means includes a roller lying in a plane parallel to said general plane of said bar, said roller being carried by a headed pin.

6. A pallet according to claim 4 wherein each drive means includes a roller lying in a plane parallel to said general plane of said bar, said roller being carried by a headed pin having a lower end seated in a mounting member, a socket formed in the upper surface of said bar receiving said mounting member, and fastener means removably retaining said mounting member in its respective socket.

7. A pallet according to claim 4 wherein a centrally positioned holding pin projects above said bar in axial alignment with said drive means.

8. A pallet according to claim 7 wherein said holding pin has a lower mounting pin seated in a bore in the upper surface of said bar, and a fastener extending through said bar into said mounting pin releasably holding said mounting pin in place.

9. A pallet according to claim 1 wherein each of said preform holders is in the form of a tubular collet having a bore therethrough of a size to receive a preform neck portion, preform retaining means carried by a lower portion of said collet, a bore in said bar having an upper portion of said collet extending therethrough, and bearing means mounting said collet for rotation relative to said bar, said bore having an upper counterbore, and said bearing means being seated in said counterbore and axially fixed to said collet.

10. A pallet according to claim 9 wherein said collet has an upper collar portion having a lower shoulder axially facing a fixed shoulder on an intermediate portion of said collet, and said bearing means being axially fixed between said shoulders.

11. A pallet according to claim 10 wherein said bearing means is retained in said counterbore by a transverse plate seated in a transverse slot formed in the upper surface of said bar.

* * * * *